(12) United States Patent
Qiu et al.

(10) Patent No.: US 11,809,444 B2
(45) Date of Patent: Nov. 7, 2023

(54) LINKED FILTER GROUPS (71) Applicant: Business Objects Software Ltd., Dublin (IE)

(72) Inventors: Xin Qiu, Vancouver (CA); Fangzhou Yin, Vancouver (CA); Ivan Cheng, Vancouver (CA); Yang Jin, Vancouver (CA); James Lloyd, Vancouver (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 0 days.

(21) Appl. No.: 16/711,273

(22) Filed: Dec. 11, 2019

(65) Prior Publication Data
US 2021/0182309 A1   Jun. 17, 2021

(51) Int. Cl.
*G06F 16/26* (2019.01)
*G06F 3/04847* (2022.01)
*G06F 16/9538* (2019.01)
*G06F 16/9535* (2019.01)
*G06F 3/0482* (2013.01)

(52) U.S. Cl.
CPC .......... *G06F 16/26* (2019.01); *G06F 3/0482* (2013.01); *G06F 3/04847* (2013.01); *G06F 16/9535* (2019.01); *G06F 16/9538* (2019.01)

(58) Field of Classification Search
CPC .... G06F 16/26; G06F 16/9535; G06F 3/0482; G06F 16/9538
USPC ........................................................ 715/738
See application file for complete search history.

(56) References Cited

U.S. PATENT DOCUMENTS

2007/0271260 A1*  11/2007  Valentino ............... G06Q 10/06
2014/0058712 A1*   2/2014  Gottemukkala ... G06Q 10/0631
                                                                703/6
2020/0233559 A1*   7/2020  Rueter .................... G06F 16/26

* cited by examiner

*Primary Examiner* — Sherrod L Keaton
(74) *Attorney, Agent, or Firm* — Fountainhead Law Group P.C.

(57) ABSTRACT

The present disclosure pertains to linked filter groups for linking a driver element of a user interface to a receiver element of the user interface such that data filters applied to driver element are propagated to the receiver element. A first linked group may include a first set of filters for a first visualization of the driver element and a first set of element identifiers of other elements in the user interface, including a first identifier of a first receiver element. When updating visualizations of the receiver element, the first set of filters of the first linked group may be aggregated with a second set of filters of the first receiver element based on the receiver element being a member of the first linked group. As such, the updates to the receiver element are based on both sets of filters.

20 Claims, 6 Drawing Sheets

LINKED FILTER GROUPS

BACKGROUND

The present disclosure relates to computing and data processing and in particular to linked filter groups for propagating filters between user interface elements.

Certain software applications may enable users to visualize a dataset. The software may allow users to customize the information shown in the user interface. For instance, the user may select particular dimensions of the dataset to be visualized and the user may apply particular filters to the dataset.

However, some users may also want to present different dimensions of the dataset side by side in the same interface. In addition, the users may want to apply different filters to different elements of the user interface. Furthermore, the users may want to have changes made to the filters of one user interface element affect the filters applied to other user interface elements.

The present disclosure addresses these issue and others, as further described below.

SUMMARY

The present disclosure provides a computer-implemented method. The method includes storing a first linked group. The first linked group includes a first set of filters for a first visualization of a driver element in a user interface. The first linked group also includes a first set of element identifiers of other elements in the user interface. The first set of element identifiers includes a first identifier of a first receiver element. The method also includes determining to aggregate the first set of filters of the first linked group with a second set of filters of the first receiver element based on the first identifier of the first receiver element being included in the first set of element identifiers of the first linked group. The method further includes accessing a dataset using a first aggregated set of filters to obtain first filtered data. The first aggregated set of filters may be based on the first set of filters of the first linked group and the second set of filters of the first receiver element. The method further includes generating a second visualization of the first receiver element based on the first filtered data.

Another embodiment of the present disclosure provides a non-transitory machine-readable medium storing a program. The program may be executable by at least one processing unit of a device. The program includes sets of instructions for storing a first linked group including a first set of filters for a first visualization of a driver element in a user interface. The first linked group also includes a first set of element identifiers of other elements in the user interface including a first identifier of a first receiver element. The program also includes sets of instructions for determining to aggregate the first set of filters of the first linked group with a second set of filters of the first receiver element. The determinations may be based on the first identifier of the first receiver element being included in the first set of element identifiers of the first linked group. The program also includes sets of instructions for accessing a dataset using a first aggregated set of filters to obtain first filtered data. The first aggregated set of filters may be based on the first set of filters of the first linked group and the second set of filters of the first receiver element. The program also includes sets of instructions for generating a second visualization of the first receiver element based on the first filtered data.

Another embodiment of the present disclosure provides a computer system. The computer system includes one or more processors and memory. The computer system also includes computer program code including instructions that are executable on the one or more processors. The computer program code is configured to store a first linked group including a first set of filters for a first visualization of a driver element in a user interface. The first linked group also includes a first set of element identifiers of other elements in the user interface including a first identifier of a first receiver element. The computer program code is also configured to determine to aggregate the first set of filters of the first linked group with a second set of filters of the first receiver element. The determination may be based on the first identifier of the first receiver element being included in the first set of element identifiers of the first linked group. The computer program code is also configured to access a dataset using a first aggregated set of filters to obtain first filtered data. The first aggregated set of filters may be based on the first set of filters of the first linked group and the second set of filters of the first receiver element to obtain first filtered data. The computer program code is also configured to generate a second visualization of the first receiver element based on the first filtered data.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein. The terms "first," "second," "third," "fourth," etc. may be used to differentiate between similar terms or phrases and do not necessarily indicate an order unless otherwise indicated.

As mentioned above, certain software applications may enable users to visualize a dataset. For example, a software application may generate maps, charts, or graphs based on the dataset for review by the user. The software may allow users to customize the information shown in the user interface. For instance, the user may select particular dimensions of the dataset to be visualized and the user may apply particular filters to the dataset.

However, some users may also want to present different dimensions of the dataset side by side in the same interface. In addition, the users may want to apply different filters to different elements of the user interface. Furthermore, the users may want to have changes made to the filters of one user interface element affect the filters applied to other user interface elements.

To achieve the filter linking functionality, certain prior software applications created a group of interface elements on the same page (e.g., window or tab) such that changes in the filters for "driver" interface elements in the group were propagated to "receiver" interface elements in the group. The interface elements being maps, charts, graphs, or other widgets (one or more objects presented in the user interface), for example. In some cases, multiple driver interface elements could be designated. However, in such prior software applications, there was only one group per page. Meaning that a particular interface element was either part of the group or not part of the group. If the interface element was not part of the group, none of the filters from any of the driver elements would be propagated to that particular element. As such, certain prior software applications were not able to accommodate multiple different groups on the same page.

The improved linked filter groups described herein provides advantages over the linked filtering techniques of prior software applications. Instead of providing a single group of receivers for each page, each driver element has its own linked filter group including a particular set of filters (e.g., the filters applied to the driver) and a particular set of receiver elements. As such, more than one interface element on a page may be designated as a "driver" and each driver element may have its own set of receiver interface elements. The flexibility in configuring the linked groups allows for there to be separate groups on the same page, which was not possible in prior software applications. In some cases, set of receiver elements can include interface elements on other pages of the user interface. In some cases, every element in the page may be a receiver of the driver. In some cases, every element on every page of the user interface may be a receiver of the driver.

In addition, when the filter for the driver is changed or updated, the driver's filter configuration may be stored in the linked group for that driver such that the receivers can access the current filter settings. Also, the linked group may be configured to automatically add newly created interface elements (e.g., a new chart or graph added to the user interface) to the group as a receiver.

To achieve the improved linked filter groups, a group object may be stored for each driver. The linked group includes an identifier of the driver element and a set of filters for a visualization of the driver element (e.g., the filters applied to the data presented in the driver element). The linked group may also include a set of receiver identifiers. The receiver identifiers may identify other interface elements in the user interface. The group can also include various setting, such as an interaction scope (e.g., the particular set of elements are receivers, all elements on the page are receivers, or all elements on all pages are receivers), whether to automatically add newly created interface elements to the group and whether to apply filters to the driver element based on particular user selections made in the user interface.

When an interface element will be updated (e.g., in response to another update event or a certain time interval), the software can determine which linked groups (if any) that the element is a member of (e.g., which linked groups have its identifier in its set of receiver identifiers). If the element is a member of a particular linked group, the software can determine to aggregate the sets of filters of those linked groups with the set of filters for the element. The underlying dataset can be accessed using the aggregated set of filters based to obtain filtered data. The filtered data being based on the filters of the element and the filters of all of the elements driving that element. Then a new visualization for the element can be generated based on the filtered data. As such, the filters applied to the driver elements are propagated to the receiver elements. Examples of linked filter groups and propagation of filters from driver elements to receiver elements is further described below.

The software implementing the linked filter groups may be implemented using cloud computing techniques where the user interface is provided by a front-end computer and the data being visualized is provided by a back-end computer.

Figure 1:
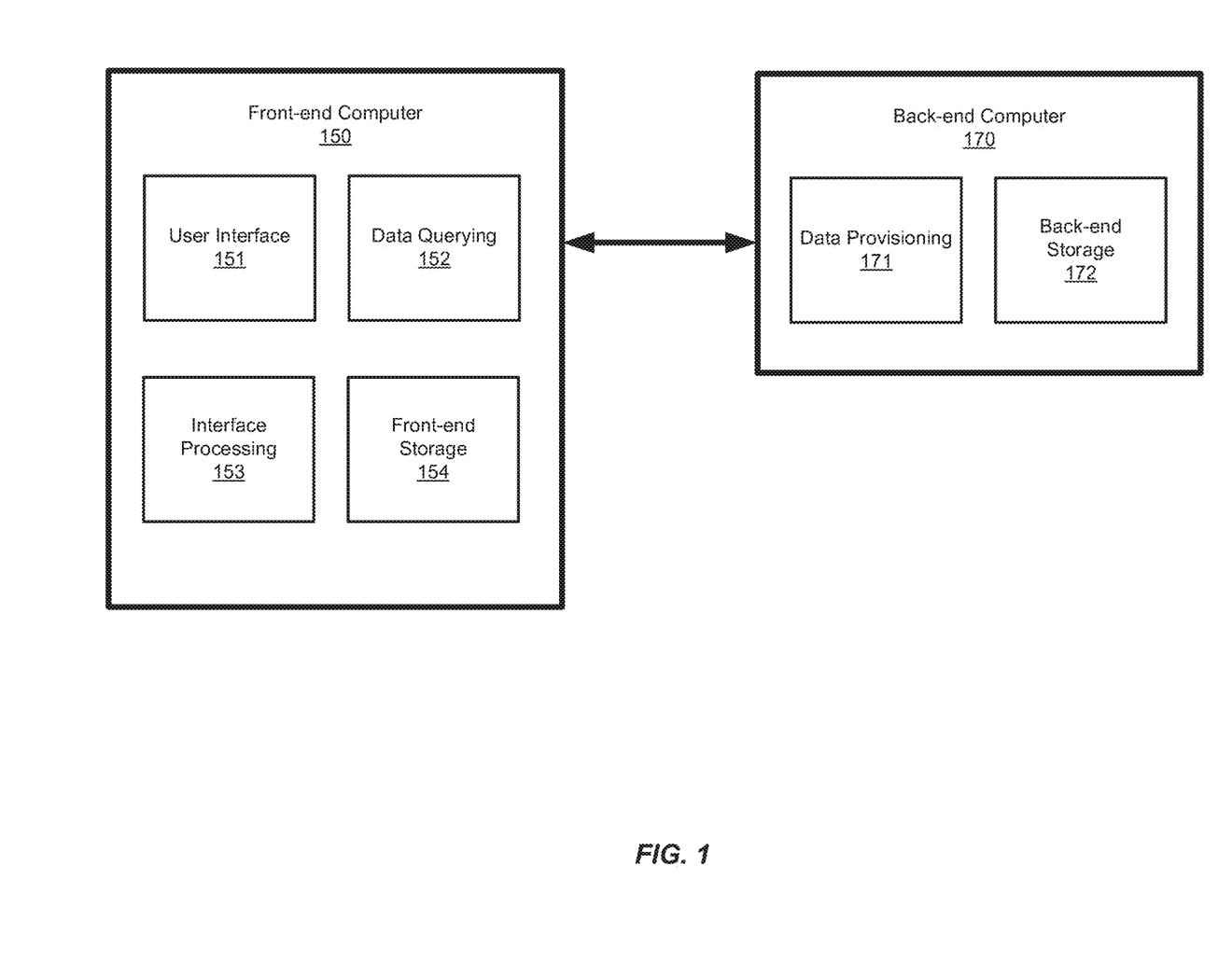
FIG. 1 shows a diagram of a computer system including a front-end computer and a back-end computer, according to an embodiment.

FIG. 1 shows a diagram of a computer system including a front-end computer 150 and a back-end computer 170, according to an embodiment. The front-end computer 150 may be referred to as a "front-end computer" because it may provide a user interface visualizing data received from a database running on the "back-end computer." In many situations, the user may see and be aware of the front-end but not the back-end. The front-end computer 150 may be a desktop computer, laptop computer, user device, server computer, or a system of more than one computer, for example. The front-end computer 150 implements the improved user interface and overlay described herein.

The front-end computer 150 may include a user interface software module 151, an interface data querying software module 152, an interface processing software module 153, and a front-end storage software module 154. In some embodiments, the user interface 151, data querying 152, and interface processing 153 modules may be implemented by a web browser executed by the front-end computer 150.

Figure 2:
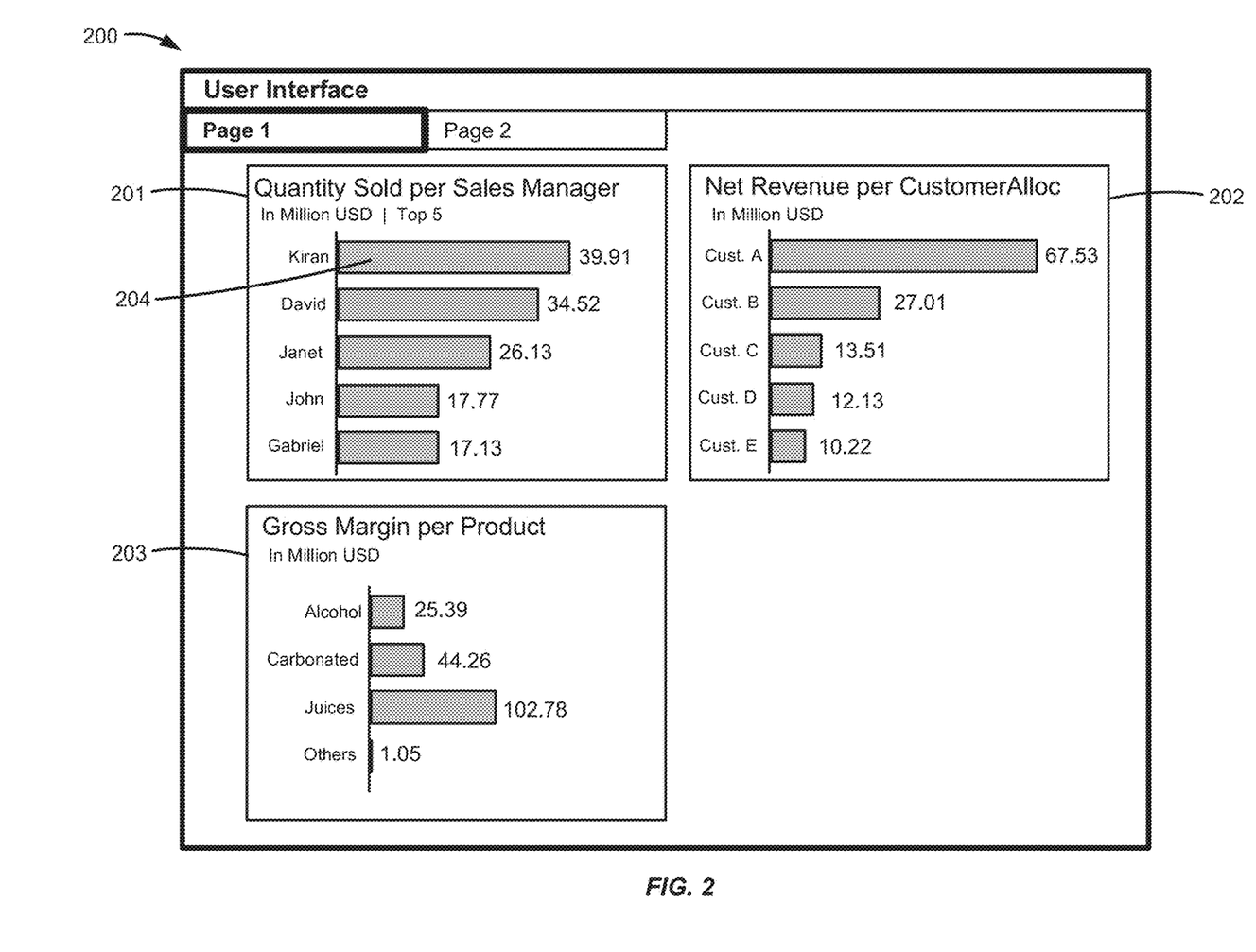
FIG. 2 shows a user interface with a plurality user interface elements having filters that may be linked, according to an embodiment.
Figure 3:
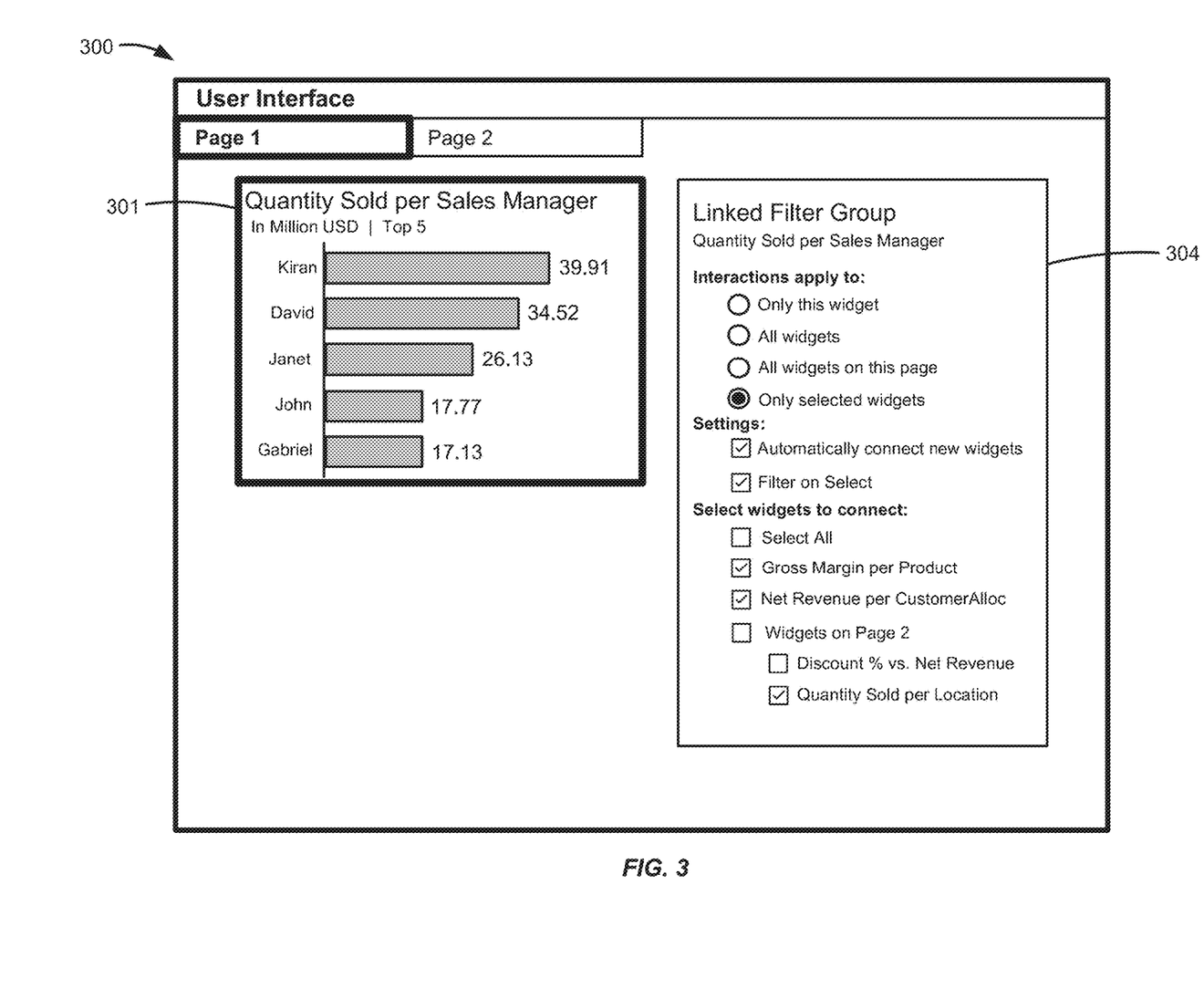
FIG. 3 shows a user interface for configuring linked groups, according to an embodiment.

The user interface software module 151 may be configured to generate, render, and display a user interface. Example user interfaces that may be generated by the user interface software module 151 are shown in FIG. 2 and FIG. 3. The user interface may be displayed to the user via a display screen (not shown). For example, the user interface module 151 may be configured to generate and present an interface for interacting with visualization data, such as maps, charts, and/or graphs.

The data querying software module 152 may be configured to generate queries to send to the back-end computer 170. The queries may request data to be processed and visualized on the user interface. For example, the data querying module 152 may send queries to the back-end server 170 to receiving information on a data model to be visualized as charts and graphs in the user interface.

The interface processing software module 153 may be configured to determine or detect changes to the user interface, generate or update linked groups, and generate or update sets of filters, for example.

The front-end storage module 154 may be configured to store data to and retrieve data from a memory of the front-end computer 150 (not shown). The memory may be a system memory or a file system of the front-end computer 150, for example. The front-end storage module 154 may handle storage of interface configuration data and models and storage of query responses, for example. For example, the linked groups and filters may be stored in a model The front-end computer 150 and the back-end computer 170 may be configured to communicate with each other over a network (not shown), such as the Internet or an intranet.

The back-end computer includes a data provisioning software module 171 and a back-end storage software module 172. The back-end computer 170 may be a server computer or a system of more than one computer, for example. The back-end computer 170 provides back-end processing for the cloud application provided by the front-end computer 150. The back-end computer 170 may be a server computer or a system of more than one computer, for example. The back-end computer 170 provides back-end processing for the cloud application provided by the front-end computer 150.

The data provisioning module 171 may be configured to receive and process the queries send by the data querying module 152 of the front-end computer 150. For example, the back-end computer may store a dataset formatted from source data (e.g., reports or logs) and a data model may be generated based on the data set. The data provisioning module 171 may provide information of the data model in response to queries from the front-end computer 150. The front-end computer 150 may use the information included in the query responses sent by the data provisioning module 171 to generate charts and/or graphs of the model generated based on the dataset, for example.

The data model may include measures and dimensions. A "measure" may refer to a set of category of a numerical values in a model. For example, gross margin, sales price, quantity sold, revenue, and discount may be measures in the model. Values of the same measure can be summed together to get a cumulative value. A "dimension" may refer to a qualitative description of the data in the model. For example, category, location, product, manager, and store may be dimensions in the model.

Various maps, charts, and graphs may be provided in the user interface to visualize the dimensions and measures of the data model. Filters may be applied to the data presented in the maps, charts, and graphs. For example, a user may set a particular level of a hierarchical dimension to be used or the user may filter out certain portions of the dimension.

FIG. 2 shows a user interface 200 with a plurality user interface elements having filters that may be linked, according to an embodiment. The user interface 200 includes a first user interface element 201, a second user interface element 202, and a third user interface element 203. The first, second, and third user interface elements may visualize portions of a dataset based on sales records for a company selling drink products to business customers. The first user interface element 201, second user interface element 202, and third user interface element 203 may be shown in a first page (e.g., "Page 1") of the user interface 200. Other user interface elements may be shown on a second page of the user interface 200 (e.g., "Page 2").

The first user interface element 201 includes a bar graph showing "quantity sold per sales manager" (in millions USD) for managers "Kiran," "David," "Janet," "John," and "Gabriel." As shown in FIG. 2, the value for "Kiran" is "39.91," the value for "David" is "34.52," the value for "Janet" is "26.13," the value for "John" is "17.77," and the value for "Gabriel" is "17.13."

The second user interface element 202 includes a bar graph showing "net revenue per customer allocation (in millions USD) for "Customer A," "Customer B," "Customer C," "Customer D," and "Customer E." As shown in FIG. 2, the value for "Customer A" is "67.53," the value for "Customer B" is "27.01," the value for "Customer C" is "13.51," the value for "Customer D" is "12.13," and the value for "Customer E" is "10.22."

The third user interface element includes a bar graph showing "gross margin per product" (in millions USD) for "alcohol," "carbonated" drinks, "juices," and "others." As shown in FIG. 2, the value for "alcohol" is "25.39," the value for "carbonated" drinks is "44.26," the value for juices is "102.78," and the value for "others" is "1.05."

As mentioned above, a user may want to link certain user interface elements together such that filters applied to one user interface element are propagated to other user interface elements. The linking of filters may involve a "driver" element propagating its filters to one or more "receiver" elements that may aggregate their own set of filters with the filters of the driver element. In some cases, the user may want to assign multiple interface elements to be drivers each with their own set of receivers. The user may achieve this functionality using linked filter groups as described herein. The configuration of linked filter groups is further described below with respect to FIG. 2 and FIG. 3.

For example, the user may want to have the filters applied to the first user interface element 201 for "quantity sold per sales manager" to be propagated to the second user interface element 202 for "net revenue per customer allocation" and the third user interface element 203 for "gross margin per product." In some embodiments, the user could assign other interface elements to be drivers. In some embodiments, an interface element on page 1 may have receivers on page 2.

For example, the user may want to be able to apply a filter to the first user interface element 201 by selecting a particular bar in the bar graph, which is based on the portion of data in the dataset for a particular manager. In one example, the user may select the bar 204 for the sales manager "Kiran" in order to cause the bar graphs for "net revenue per customer allocation" in the first user interface element 201 and "gross margin per product" in the second user interface element 202 to be updated to show to values for the sales manager "Kiran."

In this example, when the user selects the bar for "Kiran" in the first user interface element 201, the filter for the sales manager "Kiran" will be applied to the graphs for "quantity sold per sales manager" (the driver), "net revenue per customer allocation" (a receiver), and "gross margin per product" (another receiver). For example, if the sales manager "Kiran" had 5.32 million of gross margin for "carbonated" drinks based on the dataset, then the third user interface element 203 for "gross margin per product" would be updated to show "5.32" for "carbonated" drinks (not shown in FIG. 2). The bars for "alcohol," "juices," and "others" would also be updated in the third user interface element 203 based on the data for sales manager "Kiran" (not shown in FIG. 2). The second user interface element 202 would also be updated based on the data for sales manager "Kiran" as it is also a receiver of the first user interface element 201 (not shown in FIG. 2).

FIG. 3 shows a user interface 300 for configuring linked groups, according to an embodiment. In this example, the user may have selected a menu or button to configure linked filter groups for a first user interface element 301 for "quantity sold per sales manager." The first user interface element 301 of FIG. 3 corresponding to the first user interface element 201 of FIG. 2.

The user interface 300 includes a fourth user interface element 304 for configuring linked filter groups. In this example, the linked filter group for the first user interface element 301 including the graph for "quantity sold per sales manager" is being configured. As shown in FIG. 2, the user may select an interaction scope ("interactions apply to:"). The interface scope may be used to assign which interface elements are to be receivers of the filters for "quantity sold per sales manager." In this example, the term "widgets" refers to one or more user interface elements of the user interface. The interaction scope may be set to "only this widget" (e.g., there are no receivers), "all widgets" (e.g., all widgets or interface elements on all pages of the user interface are receivers, including both Page 1 and Page 2), "all widgets on this page (e.g., all widgets or interface elements on Page 1 are receivers), or "only selected widgets" (e.g., each interface element selected in the fourth user interface 304 as discussed below as receivers).

The fourth user interface element 304 may also enable the user to set whether newly created user interface elements should be added as receivers to the linked filter group for "quantity sold per sales manager" (option for "automatically connect net widgets"). The fourth user interface element 304 may also enable the user to set "quantity sold per sales manager" to "filter on select," meaning that a filter is applied to the interface element based on a selection of a portion of the user interface element (e.g., selecting sales manager "Kiran" in the bat graph will filter based on "Kiran").

The fourth user interface element 304 may also enable the user to select which interface elements are receivers of the filters set on "quantity sold per sales manager." As shown in FIG. 3, the user may "select all" or they may select individual interface elements, including elements (widgets) on "Page 2" (where "quantity sold per sales manager" is on Page 1). As shown in FIG. 2, the interface elements showing the graphs for "gross margin per product" and "net revenue per customer allocation" are set to be receivers of the filters of "quantity sold per sales manager." In addition, the graph for "quantity sold per location" shown in Page 2 is also set to be a receiver of the filters of "quantity sold per sales manager."

A linked filter group object may be generated and stored based on the settings shown in the fourth user interface element 304. The linked filter group object may include an identifier of the driver interface element (e.g., an identifier of the first user interface element 301). The linked filter group may also include an indicator of the interaction scope (e.g., only this interface element, all interface elements, all interface elements on this page, or only selected interface elements). The linked filter group may also include a set of filters (e.g., filter definition objects). The linked filter group may also include a set of interface element identifiers (e.g., an array of identifiers) that identify the user interface elements that will be receivers of the filter. The linked filter group may also include an identifier of the linked filter group. The linked filter group may also include an indicator of whether to automatically link newly created interface elements as receivers. The linked filter group may also include an indicator of whether to filter the driver element upon selection of a portion of the user interface.

The linked filter group object for the driver element may be stored in a "model." The model may be used in configuring and visualizing data in the user interface. After a linked filter group for a particular driver element is stored in the model it may be accessed when updating a visualization (e.g., the geographical map, graph, or chart) of a particular interface element. When updating, the model may be accessed using the identifier of that particular interface element to determine which groups that the interface element is a member of (e.g., which linked filter groups include the identifier of the element in the set of receiver element identifiers). Once the linked filter groups for a particular interface element are determined, the filters for each of those linked filter groups may be obtained from each of the corresponding linked filter group objects. These filters may be aggregated together along with a set of filters for the receiver interface element and used to access and filter the underlying dataset.

Although not shown in FIG. 3, the user may open a linked filter group configuration menus for other user interface elements that are similar to that shown in the fourth user interface for the first user interface element 301.

Figure 4:
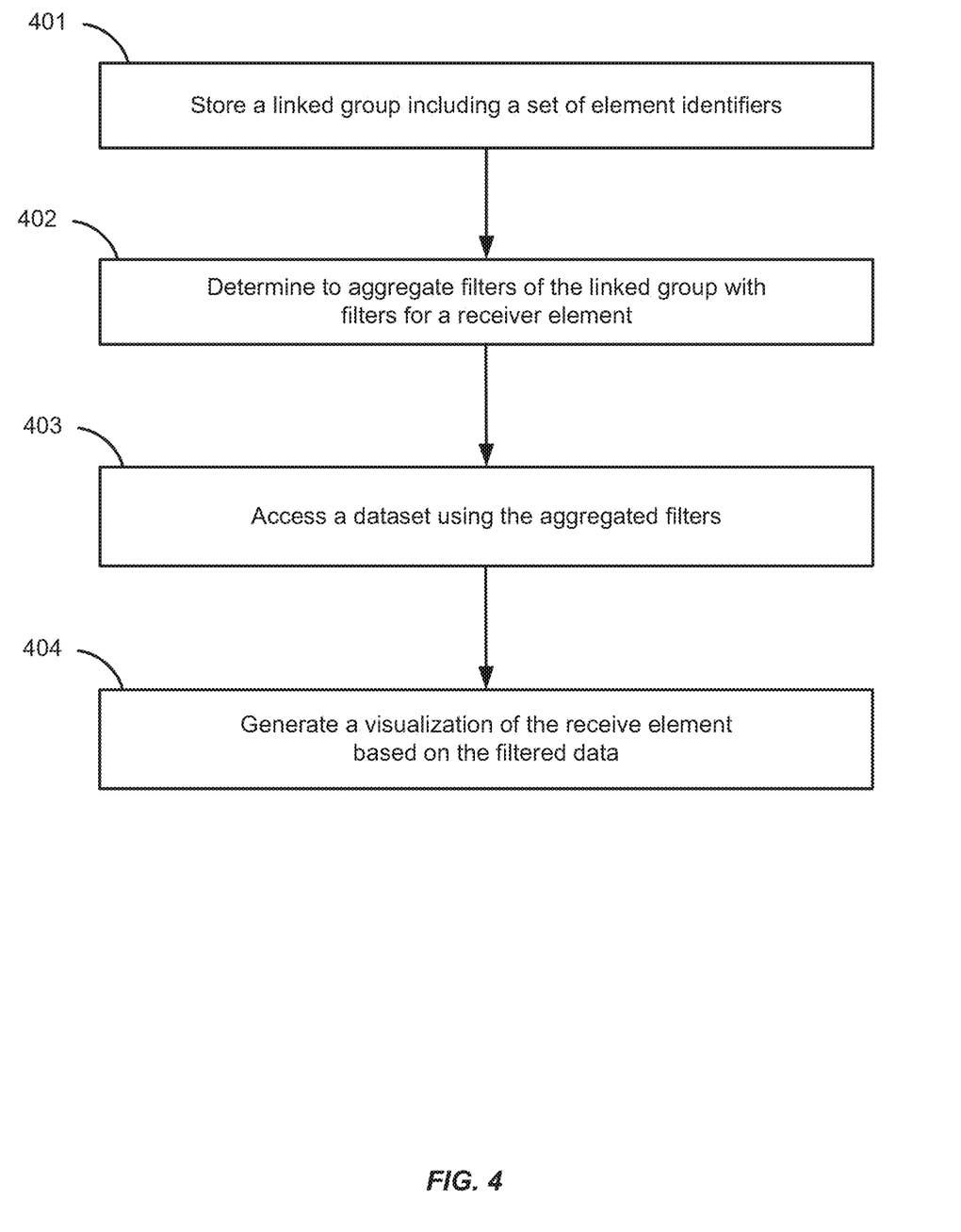
FIG. 4 shows a flowchart of a method for determining aggregated filters and generating a visualization based on filtered data, according to an embodiment.

FIG. 4 shows a flowchart of a method for determining aggregated filters and generating a visualization based on filtered data, according to an embodiment. The method may be performed by a front-end computer, for example. The order of the processes performed may be changed or performed simultaneously except where the results of one step are used by later steps.

At 401, the method further includes storing a first linked group including a first set of filters for a first visualization of a driver element in a user interface and a first set of element identifiers of other elements in the user interface including a first identifier of a first receiver element. In some embodiments, the first visualization of the driver element includes a geographical map and the second visualization of the receiver element includes a chart or a graph.

At 402, the method further includes determining to aggregate the first set of filters of the first linked group with a second set of filters of the first receiver element based on the first identifier of the first receiver element being included in the first set of element identifiers of the first linked group. In some embodiments, the method further includes aggregating the second set of filters of the first receiver element with the corresponding set of filters of each linked group having the first identifier of the first receiver element in its set of element identifiers (e.g., the first receiver element is a receiver of that linked group).

At 403, the method further includes accessing a dataset using a first aggregated set of filters based on the first set of filters of the first linked group and the second set of filters of the first receiver element to obtain first filtered data. In some embodiments, the accessing of the dataset includes querying a server using the aggregated set of filters and receiving the filtered data from the server. In embodiments where the receiver element is a receiver in other linked groups, the aggregate set of filters may be based on the sets of filters for the other linked groups as well.

At 404, the method further includes generating a second visualization of the first receiver element based on the first filtered data.

In some embodiments, the method further includes determining a third set of filters for a third visualization the driver element based on a user input. In some embodiments, the user input includes a user selection of a portion of the driver element in the user interface. In such embodiments, the method may further include accessing the dataset using a second aggregated set of filters based on the third set of filters and the second set of filters of the first receiver element to obtain second filtered data. The method may further include generating a fourth visualization of the first receiver element based on the second filtered data.

In some embodiments, the method may further include determining a user input to create a new element in the user interface. In such embodiments, the method may further include including an identifier of the new element in the first set of element identifiers of the first linked group. The method may further include accessing the dataset using a third aggregated set of filters based on the first set of filters and a new set of filters of the new element to obtain third filtered data. The method may further include generating a fifth visualization of the new receiver element based on the third filtered data.

In some embodiments, the first set of element identifiers further includes a second identifier of a second receiver element. In such embodiments, the method may further include determining to aggregate the first set of filters of the first linked group with a third set of filters of the second receiver element based on the second identifier of the second receiver element being included in the first set of element identifiers of the first linked group. In such embodiments, the method may further include accessing the dataset using a second aggregated set of filters based on the first set of filters of the first linked group and the third set of filters of the second receiver element to obtain filtered data. In such embodiments, the method may further include generating a sixth visualization of the second receiver element based on the filtered data.

Figure 5:
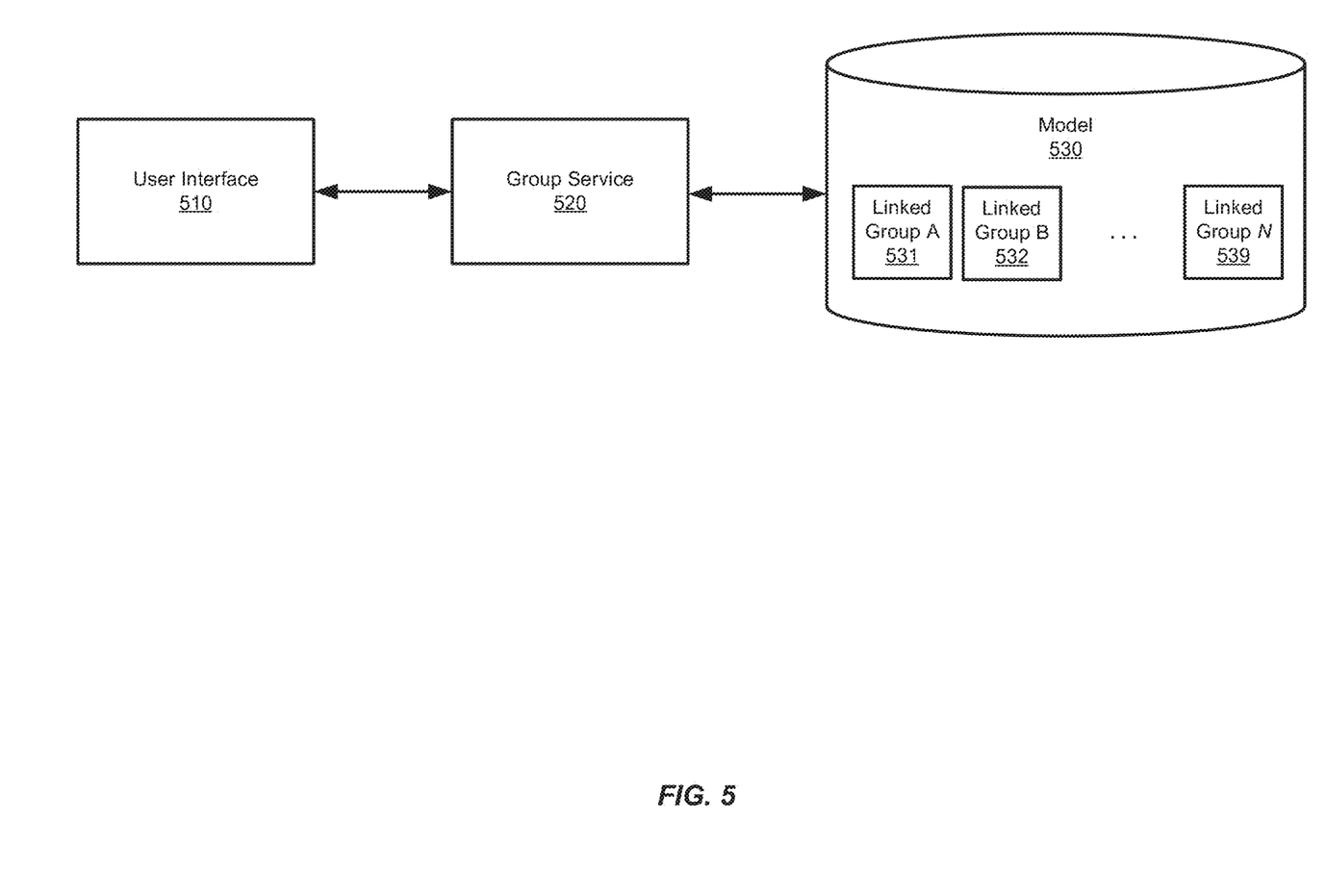
FIG. 5 shows a block diagram of a user interface, a group service, and a model, according to an embodiment.

FIG. 5 shows a block diagram of a user interface 510, a group service 520, and a model 530, according to an embodiment. The user interface 510 may the interface that the user operates on, including the various interface elements and configuration menus. The group service 520 may act as a controller of linked filter groups by creating, removing, and operating on the groups. The model 530 stores any linked filter groups, such as "Linked Group A" 531, "Linked Group B" 532, and any other linked group (e.g., all N linked filter groups through "Linked Group N" 539).

As discussed above, a linked filter group object (e.g., group 531, 532, and 539) may be generated and stored based on linked filter group configuration settings as described with respect to FIG. 3. The linked filter group object may include an identifier of the driver interface element. The linked filter group may also include an indicator of the interaction scope (e.g., only this interface element, all interface elements, all interface elements on this page, or only selected interface elements). The linked filter group may also include a set of filters (e.g., filter definition objects). The linked filter group may also include a set of interface element identifiers (e.g., an array of identifiers) that identify the user interface elements that will be receivers of the filter. The linked filter group may also include an identifier of the linked filter group. The linked filter group may also include an indicator of whether to automatically link newly created interface elements as receivers. The linked filter group may also include an indicator of whether to filter the driver element upon selection of a portion of the user interface.

The group service 520 includes functionality for operating on the linked filter groups. The group service 520 may create a linked filter group or remove a linked filter group. The group service 520 may also determine a set of filters from the linked filter groups based on an element identifier. The group service 520 may also determine a list of array of linked filter group objects based on an element identifier. The group service 520 a linked filter group based on an identifier of the group.

The group service 520 may also listen for and monitor events performed in or by the user interface 510. For example, the group service 520 may monitor for new interface elements being added to the user interface 510, for interface elements being removed from the user interface 510, and for filters being set on interface elements of the user interface 510. Accordingly, when a new filter is created for a particular interface element, the group service 520 can be used to determine whether the interface element is a driver having a linked filter group and the set of filters stored in that linked filter group can be updated. In addition, when a new interface element is added to the user interface 510, the group service 520 can be used update the set of interface element identifiers in the linked groups having the option selected to automatically add newly created elements. The set of interface element identifiers in a particular linked filter group can also be updated when an interface element is added as a receiver or removed as a receiver. In some embodiments, instead of updating the linked filter group objects, a new linked filter group object may be created with the updated settings and configurations and the old linked filter group object may be deleted.

The linked filter groups described herein provide advantages over prior filtering techniques. Instead of providing a single group of receivers for each page, each driver element has its own linked filter group including a particular set of filters (e.g., the filters applied to the driver) and a particular set of receiver elements. As such, more than one interface element on a page may be designated as a "driver" and each driver element may have its own set of receiver interface elements. The flexibility in configuring the linked groups allows for there to be separate groups on the same page, which may not possible in filtering techniques. The linked filter groups enable the user to create more sophisticated relationships between the user interface elements, thereby allowing the user to better review and analyze the data being visualized in the user interface.

Figure 6:
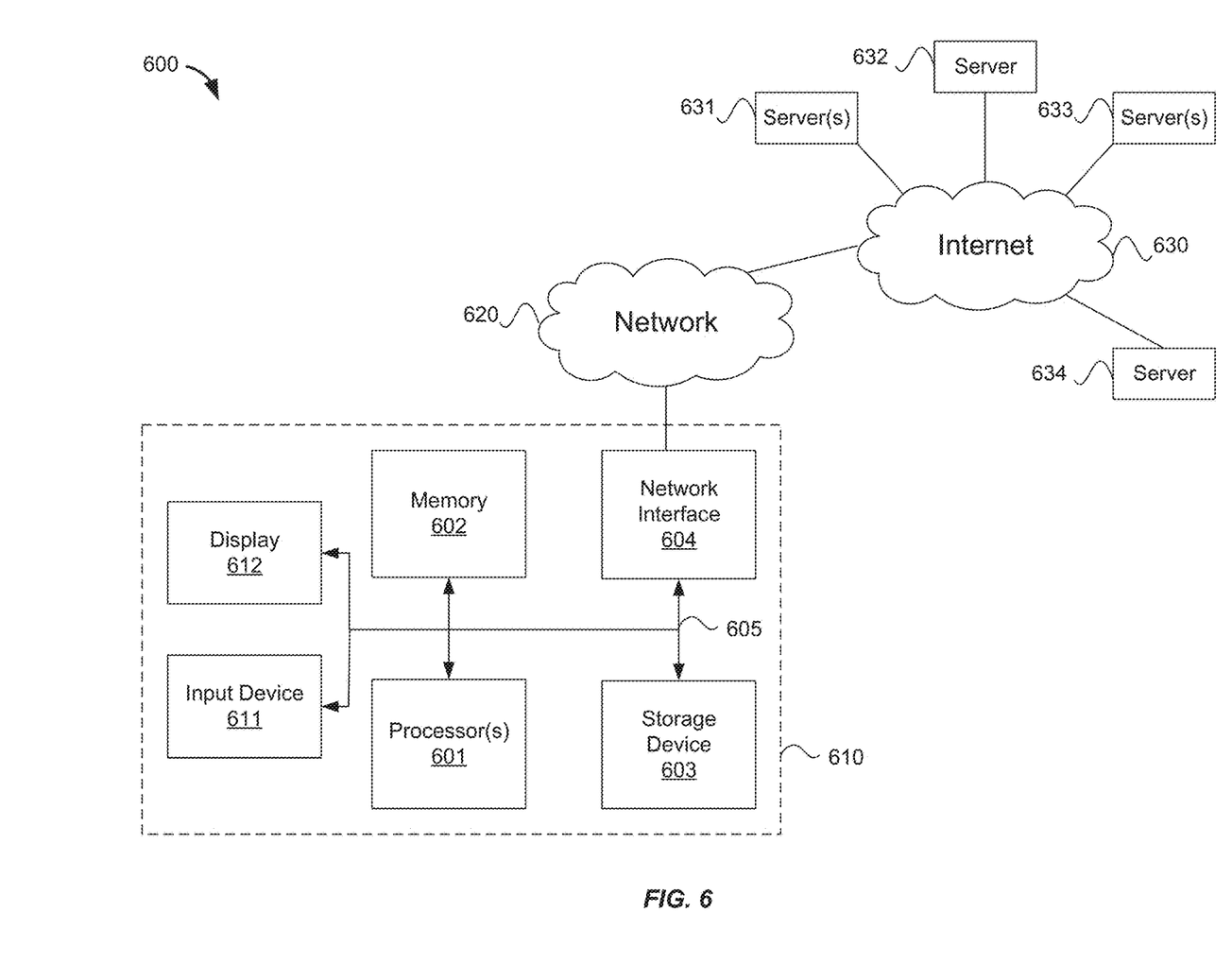
FIG. 6 shows a diagram of hardware of a special purpose computing machine for implementing systems and methods described herein.

FIG. 6 shows a diagram of hardware of a special purpose computing machine for implementing systems and methods described herein. The following hardware description is merely one example. It is to be understood that a variety of computers topologies may be used to implement the above described techniques.

An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. This memory may also be used for storing programs executed by processor(s) 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

Computer system also includes a network interface 604 coupled with bus 605. Network interface 604 may provide two-way data communication between computer system 610 and a network 620. The network interface 604 may be a wireless or wired connection, for example. Computer system 610 can send and receive information through the network interface 604 across a local area network, an Intranet, a cellular network, or the Internet, for example. In the Internet example, a browser, for example, may access data and features on backend systems that may reside on multiple different hardware servers 631-634 across the network. The servers 631-634 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method, comprising:
presenting a linked group configuration interface in response to a user input selecting a menu or button to configure linked filter groups for a first visualization in a user interface, the linked group configuration interface including one or more selectable interface elements that may be selected to assign the first visualization as a driver element of a selected interface elements in the linked group configuration interface;
obtaining user input selections to the linked group configuration interface assigning the first visualization as a driver of a first receiver element in the user interface such that filters applied to the driver element are propagated to the first receiver element;
generating a first linked group based on the user input selections to the linked group configuration interface;
storing the first linked group in a model, the first linked group including a first set of filters for filtering a dataset in generating the first visualization of the driver element in the user interface, the first linked group including a first set of element identifiers of other elements in the user interface including a first identifier of the first receiver element;
accessing the model, when updating the first receiver element using the first identifier of the first receiver, to determine one or more linked groups that include the first identifier in their corresponding set of element identifiers, and to obtain filters from each of the one or more linked groups;
aggregating the filters from each of the one or more linked groups to determine a first aggregated set of filters, wherein the aggregating of the filters from each of the one or more linked groups includes aggregating the first set of filters for the first visualization with a second set of filters for the first receiver element;
accessing the dataset using the first aggregated set of filters to obtain first filtered data;
generating a second visualization of the first receiver element based on the first filtered data;
obtaining a user selection of a portion of the driver element in the user interface;
obtaining a third set of filters for a third visualization of the driver element based on the user selection of the portion of the driver element;
applying a second aggregated set of filters on the dataset based on the third set of filters and the second set of filters of the first receiver element to obtain second filtered data; and
generating a fourth visualization of the first receiver element based on the second filtered data.

2. The computer-implemented method of claim 1, further comprising:
determining a user input to create a new receiver element in the user interface;
including an identifier of the new element in the first set of element identifiers of the first linked group;
accessing the dataset using a third aggregated set of filters based on the first set of filters and a new set of filters of the new receiver element to obtain third filtered data; and
generating a fifth visualization of the new receiver element based on the third filtered data.

3. The computer-implemented method of claim 1, wherein the first set of element identifiers further includes a second identifier of a second receiver element, the method further comprising:
determining to aggregate the first set of filters of the first linked group with a third set of filters of the second receiver element based on the second identifier of the second receiver element being included in the first set of element identifiers of the first linked group;
accessing the dataset using a second aggregated set of filters based on the first set of filters of the first linked group and the third set of filters of the second receiver element to obtain filtered data; and
generating a sixth visualization of the second receiver element based on the filtered data.

4. The computer-implemented method of claim 1, wherein the accessing of the dataset includes querying a server using the aggregated set of filters and receiving the filtered data from the server.

5. The computer-implemented method of claim 1, wherein the first visualization of the driver element includes a geographical map, and wherein the second visualization of the receiver element includes a chart or a graph.

6. The computer-implemented method of claim 1, wherein the linked group configuration interface includes a filter-on-select setting, the filter-on-select setting being set such a filter is applied to the receiver element based on a selection of a portion of the driver element.

7. The computer-implemented method of claim 1, wherein the linked group configuration interface includes a checkbox for selecting the first receiver element to be included in the first linked group.

8. The computer-implemented method of claim 1, wherein the model is associated with a group service, wherein said group service acts as a controller of linked filter groups by creating, removing, and operating on the linked filter groups.

9. The computer-implemented method of claim 1, wherein the linked group configuration interface includes an interface scope configuration, the interface scope configuration being settable to "only this interface element", "all interface elements", "all widgets on this page", or "only selected widgets".

10. The computer-implemented method of claim 1, wherein the linked group configuration interface includes settings to set whether newly created user interface elements are added as receivers to the first linked group.

11. A non-transitory machine-readable medium storing a program executable by at least one processing unit of a device, the program comprising sets of instructions for:
presenting a linked group configuration interface in response to a user input selecting a menu or button to configure linked filter groups for a first visualization in a user interface, the linked group configuration interface including one or more selectable interface elements that may be selected to assign the first visualization as a driver element of a selected interface elements in the linked group configuration interface;
obtaining user input selections to the linked group configuration interface assigning the first visualization as a driver of a first receiver element in the user interface such that filters applied to the driver element are propagated to the first receiver element;
generating a first linked group based on the user input selections to the linked group configuration interface;
storing the first linked group in a model, the first linked group including a first set of filters for filtering a dataset in generating the first visualization of the driver element in the user interface, the first linked group including a first set of element identifiers of other elements in the user interface including a first identifier of the first receiver element;
accessing the model, when updating the first receiver element using the first identifier of the first receiver, to determine one or more linked groups that include the first identifier in their corresponding set of element identifiers, and to obtain filters from each of the one or more linked groups;
aggregating the filters from each of the one or more linked groups to determine a first aggregated set of filters, wherein the aggregating of the filters from each of the one or more linked groups includes aggregating the first set of filters for the first visualization with a second set of filters for the first receiver element;
accessing the dataset using the first aggregated set of filters to obtain first filtered data;
generating a second visualization of the first receiver element based on the first filtered data;
obtaining a user selection of a portion of the driver element in the user interface;
obtaining a third set of filters for a third visualization of the driver element based on the user selection of the portion of the driver element;
applying a second aggregated set of filters on the dataset based on the third set of filters and the second set of filters of the first receiver element to obtain second filtered data; and
generating a fourth visualization of the first receiver element based on the second filtered data.

12. The non-transitory machine-readable medium of claim 11, wherein the program further comprises sets of instructions for:
determining a user input to create a new receiver element in the user interface;
including an identifier of the new element in the first set of element identifiers of the first linked group;
accessing the dataset using a third aggregated set of filters based on the first set of filters and a new set of filters of the new receiver element to obtain third filtered data; and
generating a fifth visualization of the new receiver element based on the third filtered data.

13. The non-transitory machine-readable medium of claim 11, wherein the first set of element identifiers further includes a second identifier of a second receiver element, and wherein the program further comprises sets of instructions for:
determining to aggregate the first set of filters of the first linked group with a third set of filters of the second receiver element based on the second identifier of the second receiver element being included in the first set of element identifiers of the first linked group;
accessing the dataset using a second aggregated set of filters based on the first set of filters of the first linked group and the third set of filters of the second receiver element to obtain filtered data; and
generating a sixth visualization of the second receiver element based on the filtered data.

14. The non-transitory machine-readable medium of claim 11, wherein the accessing of the dataset includes querying a server using the aggregated set of filters and receiving the filtered data from the server.

15. The non-transitory machine-readable medium of claim 11, wherein the first visualization of the driver element includes a geographical map, and wherein the second visualization of the receiver element includes a chart or a graph.

16. A computer system, comprising:
one or more processors;
memory; and
computer program code comprising instructions, executable on the one or more processors, the computer program code configured to:
present a linked group configuration interface in response to a user input selecting a menu or button to configure linked filter groups for a first visualization in a user interface, the linked group configuration interface including one or more selectable interface elements that may be selected to assign the first visualization as a driver element of a selected interface elements in the linked group configuration interface;
obtain user input selections to the linked group configuration interface assigning the first visualization as a driver of a first receiver element in the user interface such that filters applied to the driver element are propagated to the first receiver element;
generate a first linked group based on the user input selections to the linked group configuration interface;
store the first linked group in a model, the first linked group including a first set of filters for filtering a dataset in generating the first visualization of the driver element in a user interface, the first linked group including a first set of element identifiers of other elements in the user interface including the first identifier of a first receiver element;
access the model, when updating the first receiver element using the first identifier of the first receiver, to determine one or more linked groups that include the first identifier in their corresponding set of element identifiers, and to obtain filters from each of the one or more linked groups;
aggregate the filters from each of the one or more linked groups to determine a first aggregated set of filters, wherein the aggregating of the filters from each of the one or more linked groups includes aggregating the first set of filters for the first visualization with a second set of filters for the first receiver element;
access the dataset using the first aggregated set of filters to obtain first filtered data;

generate a second visualization of the first receiver element based on the first filtered data;
obtain a user selection of a portion of the driver element in the user interface;
obtain a third set of filters for a third visualization of the driver element based on the user selection of the portion of the driver element;
apply a second aggregated set of filters on the dataset based on the third set of filters and the second set of filters of the first receiver element to obtain second filtered data; and
generate a fourth visualization of the first receiver element based on the second filtered data.

17. The computer system of claim 16, wherein the computer program code is further configured to:
determine a user input to create a new receiver element in the user interface;
include an identifier of the new element in the first set of element identifiers of the first linked group;
access the dataset using a third aggregated set of filters based on the first set of filters and a new set of filters of the new receiver element to obtain third filtered data; and
generate a fifth visualization of the new receiver element based on the third filtered data.

18. The computer system of claim 16, wherein the first set of element identifiers further includes a second identifier of a second receiver element, and wherein the computer program code is further configured to:
determine to aggregate the first set of filters of the first linked group with a third set of filters of the second receiver element based on the second identifier of the second receiver element being included in the first set of element identifiers of the first linked group;
access the dataset using a second aggregated set of filters based on the first set of filters of the first linked group and the third set of filters of the second receiver element to obtain filtered data; and
generate a sixth visualization of the second receiver element based on the filtered data.

19. The computer system of claim 16, wherein the accessing of the dataset includes querying a server using the aggregated set of filters and receiving the filtered data from the server.

20. The computer system of claim 16, wherein the first visualization of the driver element includes a geographical map, and wherein the second visualization of the receiver element includes a chart or a graph.

* * * * *